(12) United States Patent
Sawai

(10) Patent No.: US 6,717,767 B2
(45) Date of Patent: Apr. 6, 2004

(54) MAGNETIC TAPE DEVICE

(75) Inventor: Kunio Sawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/210,245

(22) Filed: Aug. 1, 2002

(65) Prior Publication Data

US 2003/0035243 A1 Feb. 20, 2003

(30) Foreign Application Priority Data

Aug. 17, 2001 (JP) ........................................ 2001-5429 U

(51) Int. Cl.$^7$ .............................................. G11B 15/00
(52) U.S. Cl. ...................................................... 360/96.5
(58) Field of Search ........................................ 360/96.5

(56) References Cited

FOREIGN PATENT DOCUMENTS

| JP | 62-29661 | 2/1987 |
| JP | 2-58755 | 2/1990 |
| JP | 10-21611 | 1/1998 |
| JP | 10-162459 | 6/1998 |

*Primary Examiner*—George J. Letscher
(74) *Attorney, Agent, or Firm*—Rosenthal & Osha L.L.P.

(57) ABSTRACT

A cassette table which is moved in a cassette traveling path has a support plate which is configured by a metal plate having elasticity, side walls, and cassette pressers. A magnetic tape device has swing levers which press down projections disposed on the side walls to lower the cassette table, and seats on which the tape cassette placed on the support plate is to sit. Swinging operation of the swing levers in a stage after the tape cassette sits on the seats is allowed by flexural deformation of the support plate.

8 Claims, 9 Drawing Sheets

MAGNETIC TAPE DEVICE

BACKGROUND OF THE INVENTION

1. Field of the Invention

The present invention relates to a magnetic tape device, and more particularly to a magnetic tape device in which the reference position of a tape cassette is restricted by pressing the tape cassette against seats.

2. Description of the Related Art

FIGS. 12 to 17 illustratively show main portions of a magnetic tape device of this kind. The magnetic tape device includes seats 21, 22, and 23 which are shown in FIG. 16 or 17, and which are defined in the same level, at plural places of a metal chassis 10 having lateral side plates 11. Among the seats, the two illustrated seats 21 and 23 are formed by the upper end faces of raised pieces 13 and 14 which are formed by raising portions of the chassis 10, respectively, and the other seat 22 is formed by the upper end face of a column 15 which is made of a synthetic resin, and which is attached to the chassis 10. The two seats 21 and 22, which are laterally aligned, are provided with guide pins 24 and 25 having tapered top end, respectively.

As shown in FIG. 12, a cassette table 30 is attached between the lateral side plates 11 of the chassis 10. The cassette table 30 includes a support plate 31 which is configured by a laterally extending metal plate member, lateral side walls 32 which are fixed to lateral ends of the support plate 31 respectively, and cassette pressers 33 which are disposed integrally with upper end portions of the side walls 32 respectively. As shown in FIGS. 14 and 15, a spring plate 34 is attached to one of the cassette pressers 33, and a stopper 37 is disposed on one of the side walls 32. The other cassette presser 33 and the other side wall 32 are configured in the same manner as described above. As shown in FIG. 12, a projection 35 and a guide pin 36 are outwardly projected from each of the lateral side walls 32. The projections 35 and the guide pins 36 are slidably fitted into cam grooves 16 and 17 which are symmetrically formed in the lateral side walls 32, and which are indicated by the phantom lines in FIG. 13, respectively. A reciprocation path A1 which longitudinally elongates, and a lift path A2 which vertically elongates are formed by each of the cam grooves 16 into which the projections 35 are fitted. The cam grooves 17 into which the guide pins 36 are fitted are configured in the same manner.

As shown in FIG. 12, table driving levers 40 are placed inside the lateral side plates 11, respectively. The swinging operations of the table driving levers 40 are synchronized with each other by a synchronization shaft 41, and the table driving levers can be swung about the axis P which is indicated by the dashed line in FIG. 12. As can be seen also from FIG. 13 showing one of the table driving levers 40, the basal portion of the table driving lever 40 is attached to the lateral side plate 11 of the chassis 10 via a support shaft 42. The axis of the support shaft 42 is brought into line with the above-mentioned axis P. A groove 43 into which the projection 35 is fitted is formed in the table driving lever 40. A spring member 44 configured by a torsion coil spring which presses the projection 35 against a groove wall 43a of the groove 43 is attached to the table driving lever. The table driving lever 40 is swung in longitudinal and vertical directions about the axis P by a driving source which is not shown.

In the thus configured conventional magnetic tape device, the cassette table 30 is moved in a cassette traveling path which elongates between a cassette insertion position and a cassette delivery position which is below the cassette insertion position. As shown in FIG. 13, the cassette traveling path A is formed by the reciprocation path A1 and the lift path A2.

When the cassette table 30 is located at the cassette insertion position, the projections 35 are located in the reciprocation paths A1 as indicated by the solid line in FIG. 13. A box-like tape cassette 100 is inserted on the cassette table 30 which is waiting at the cassette insertion position. After the tape cassette 100 is inserted on the cassette table 30, as shown in FIG. 14, the tape cassette 100 is placed on the support plate 31 and abuts against the stoppers 37, and is elastically pressed against the support plate 31 by the spring force of the spring plate 34. Therefore, the tape cassette 100 is positioned to a predetermined position of the cassette table 30.

When the table driving levers 40 are backwardly swung from this state as indicated by the arrow R in FIG. 13, the projections 35 which are pressed against the groove walls 43a by the spring members 44 are backwardly moved in the reciprocation paths A1 in accordance with the backward swinging of the table driving levers 40. Thereafter, the table driving levers 40 are downwardly swung, so that the projections 35 which are pressed against the groove walls 43a by the spring members 44 enter the lift paths A2 from the reciprocation paths A1 and then go down in the lift paths A2. Therefore, the cassette table 30 is moved together with the projections 35 along the reciprocation paths A1 and the lift paths A2. When the projections 35 are pressed down in the lift paths A2 by such an operation of the table driving levers 40, the cassette table 30 also is lowered together with the projections 35. On the way of the lowering of the cassette table 30, as shown in FIG. 17, positioning holes 110 formed in the tape cassette 100 placed on the support plate 31 are fitted onto the guide pins 24 and 25 respectively, and the tape cassette 100 sits on the seats 21 and 22, and also on the seat 23 shown in FIG. 16.

After the tape cassette 100 sits on the seats 21, 22, and 23, the table driving levers 40 are slightly downwardly swung. By the swinging of the table driving levers 40 in this stage, the cassette table 30 is lowered in accordance with the pressing down operation of the projections 35, and the cassette pressers 33 abut against the upper face of the tape cassette 100 as shown in FIG. 15. After the cassette pressers 33 abut against the upper face of the tape cassette 100 in this way, the spring members 44 which are engaged with the projections 35 are deformed against their elasticity, whereby the table driving levers 40 are allowed to swing (the arrow R1) until the levers reach their limit positions. In a state where the table driving levers 40 are fully swung to the limit positions, the cassette pressers 33 downwardly press the tape cassette 100 against the seats 21, 22, and 23 (see FIGS. 16 and 17) by a force corresponding to the reaction force to the elastic deformation of the spring members 44 as indicated by the arrow d in FIG. 15. In this way, the tape cassette 100 is positioned to a reference position for tape loading, recording and reproduction, and the like.

JP-A-10-162459 (prior art example 1) discloses a magnetic tape device which is configured in a substantially similar manner as the above-described conventional magnetic tape device. JP-A-2-58755 (prior art example 2) discloses a cassette loading device including a spring plate which is of the same kind as the spring plate 34 used in the above-described conventional magnetic tape device.

In the conventional magnetic tape device described above, the spring plate 34 for positioning the tape cassette 100 with respect to the cassette table 30, and the spring members 44 for pressing the tape cassette 100 sitting on the seats 21, 22, and 23 against the seats 21, 22, and 23 to position the cassette to the reference position are required. Moreover, steps of attaching these components are necessary. Therefore, there arises a problem in that the numbers of parts and assembly steps are correspondingly increased, so that the production cost is raised.

The above mentioned prior art example 1 shows members corresponding to the spring members 44, and prior art example 2 shows a member corresponding to the spring plate 34. Consequently, the problem cannot be solved by these prior art examples.

SUMMARY OF THE INVENTION

The invention has been conducted in view of the above circumstances.

In the invention, the attention is paid to the fact that a support plate disposed in a cassette table is formed by a metal plate member and the support plate has elasticity peculiar to a metal plate. It is an object of the invention to provide a magnetic tape device in which the spring members 44 that are employed in the conventional magnetic tape device can be omitted by using the above-mentioned elasticity of the support plate.

It is another object of the invention to provide a magnetic tape device in which the spring plate 34 that is employed in the conventional magnetic tape device can be omitted by using the above-mentioned elasticity of the support plate.

In order to solve the above problem, there is provided a magnetic tape device having a cassette table which is moved in a cassette traveling path that elongates between a cassette insertion position and a cassette delivery position which is below the cassette insertion position, the cassette table including a support plate on which a tape cassette is placed; a cassette presser disposed on the support plate, the cassette presser faces the tape cassette from an upper side; a table pressing-down member for lowering the cassette table from a position which is above the cassette derivery position toward the cassette delivery position; and a seat on which the tape cassette is sittable on the way of the cassette table down to the cassette delivery position, wherein the tape cassette is pressed down and positioned to a reference position by the cassette presser which moves together with the cassette table, the support plate is configured by an elastic plate member, swinging operation of the table pressing-down member in a state where the tape cassette sits on the seat is allowed by a sliding operation of the cassette pressers with respect to the tape cassette, the sliding operation being conducted with flexurally deforming the support plate against elasticity of the support plate.

According to this configuration, when the cassette pressers downwardly press the tape cassette sitting on the seats, the support plate is flexurally deformed against its elasticity by the sliding operation of the cassette pressers with respect to the tape cassette. Therefore, the cassette pressers press the tape cassette against the seats by a force corresponding to the reaction force to the elastic deformation of the support plate, thereby positioning the tape cassette to the reference position. Consequently, the support plate formed by the plate member having elasticity performs the same function as the spring members 44 which have been described with reference to FIG. 13, and hence the spring members 44 can be omitted.

In the invention, it is possible to employ a configuration in which the cassette pressers are continuously integrated with upper end portions of lateral side walls which are fixed to ends of the support plate, respectively, and which are opposed to side faces of the tape cassette placed on the support plate, respectively. According to this configuration, the cassette pressers can be configured in the same manner as those in the conventional art.

In the invention, it is possible to employ a configuration in which the table pressing-down member is configured by swing levers which are engaged with projections disposed on the side walls, respectively, and which is downwardly swung with using a given position as a fulcrum, thereby pressing down the projections to lower the cassette table from the position above the cassette delivery position toward the cassette delivery position. According to this configuration, the table pressing-down means can be configured without largely changing the configuration of the conventional art.

In the invention, it is possible to employ a configuration in which the side walls including the cassette pressers are fixed to lateral ends of the support plate, respectively, and the swing levers which operate in synchronization with each other are engaged with the projections disposed on the side walls, respectively. According to this configuration, the cassette table can be configured without largely changing the configuration of the conventional art.

In the invention, it is possible to employ a configuration in which each of the cassette pressers has a protruding piece which extends above the tape cassette placed on the support plate and a long an upper face of the tape cassette, and a protrusion which downwardly protrudes from the protruding piece to face the upper face of the tape cassette. Alternatively, a configuration in which each of the cassette pressers has a forward and upward inclined face which faces an edge of the tape cassette placed on the support plate may be employed. According to these configurations, the cassette pressers can be molded integrally with the side walls of the cassette table by a synthetic resin. This is useful for suppressing the number of parts to enable the cost reduction.

In the invention, it is preferable to configure the device so that the tape cassette which is placed on the support plate at the cassette insertion position is positioned with respect to the cassette table by clamping the tape cassette between the support plate and the cassette pressers. According to this configuration, the cassette pressers perform the same function as the spring plate 34 in the conventional art which has been described with reference to FIG. 14, and hence the spring plate 34 can be omitted.

The magnetic tape device of the invention can be configured in the following manner: a magnetic tape device having a cassette table which is moved in a cassette traveling path that elongates between a cassette insertion position and a cassette delivery position which is below the cassette insertion position, the cassette table including a support plate on which a tape cassette is placed, the support plate is configured by an elastic metal plate member; a plurality of side walls fixed to lateral ends of the support plate respectively, each of side walls having a projection; a plurality of cassette pressers disposed on upper end portions of the side walls, the cassette pressers face the tape cassette from an upper side; a plurality of swing levers engaged with the projection, the swing levers are downwardly swingable from a predetermined position thereby pressing down the projection to lower the cassette table from a position which is above the cassette delivery position toward the cassette delivery position; and a plurality of seats on which the tape cassette is sittable on the way of the cassette table down to the cassette delivery position, wherein the swing levers are configured respectively by members which are also used as table driving levers that move the cassette table between the cassette insertion position and the cassette delivery position through the cassette traveling path, the tape cassette placed on the support plate at the cassette insertion position is positioned with respect to the cassette table by being clamped between the support plate and the cassette pressers, the swinging operation of the swing levers for pressing down the projections in a state where the tape cassette sits on the seats is allowed by a sliding operation of the cassette pressers with respect to the tape cassette, the sliding operation being conducted with flexurally deforming the support plate against elasticity of the support plate.

According to this configuration, the spring plate 34 and the spring members 44 in the conventional art are not necessary, and a magnetic tape device can be configured without using those kinds of members.

DETAILED DESCRIPTION OF THE PRESENT INVENTION

Figure 1:
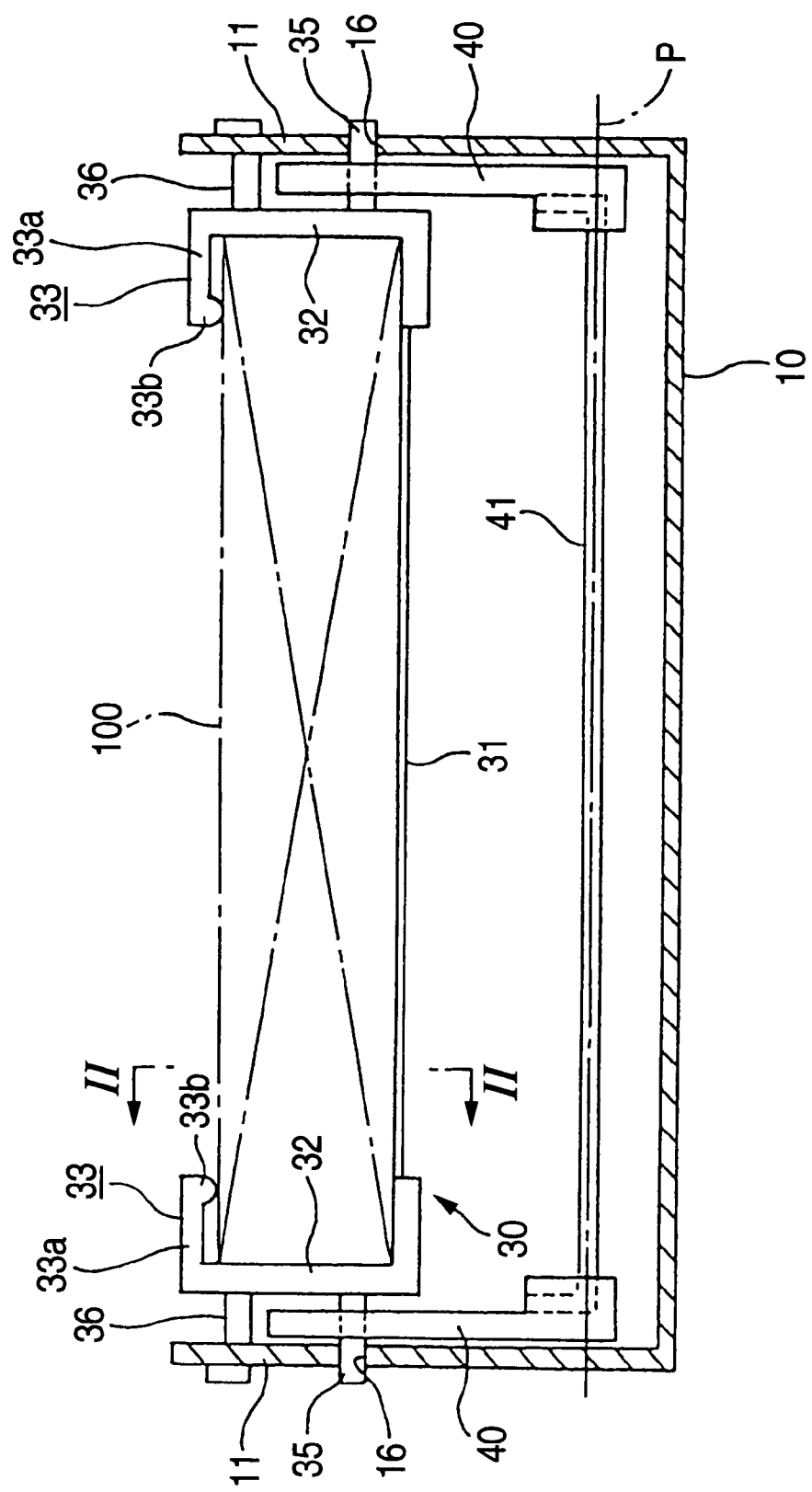
FIG. 1 is a front view illustratively showing main portions of an embodiment of the magnetic tape device of the invention.
Figure 2:
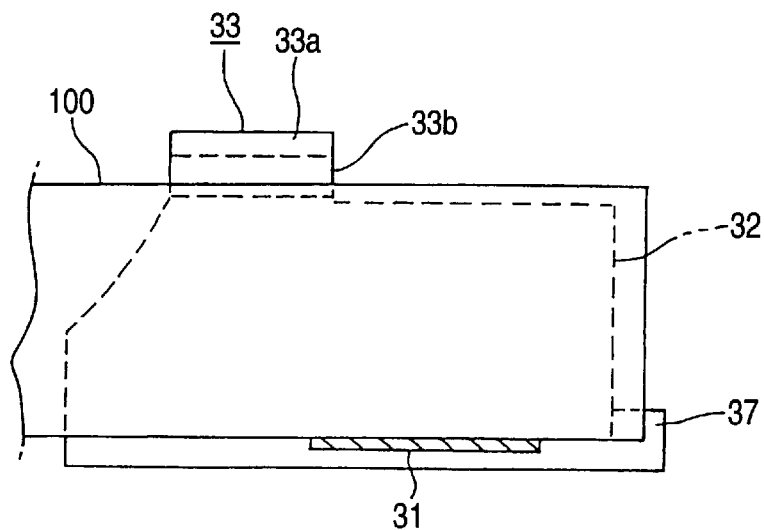
FIG. 2 is a schematic sectional view of a portion along the line II—II of FIG. 1.
Figure 3:
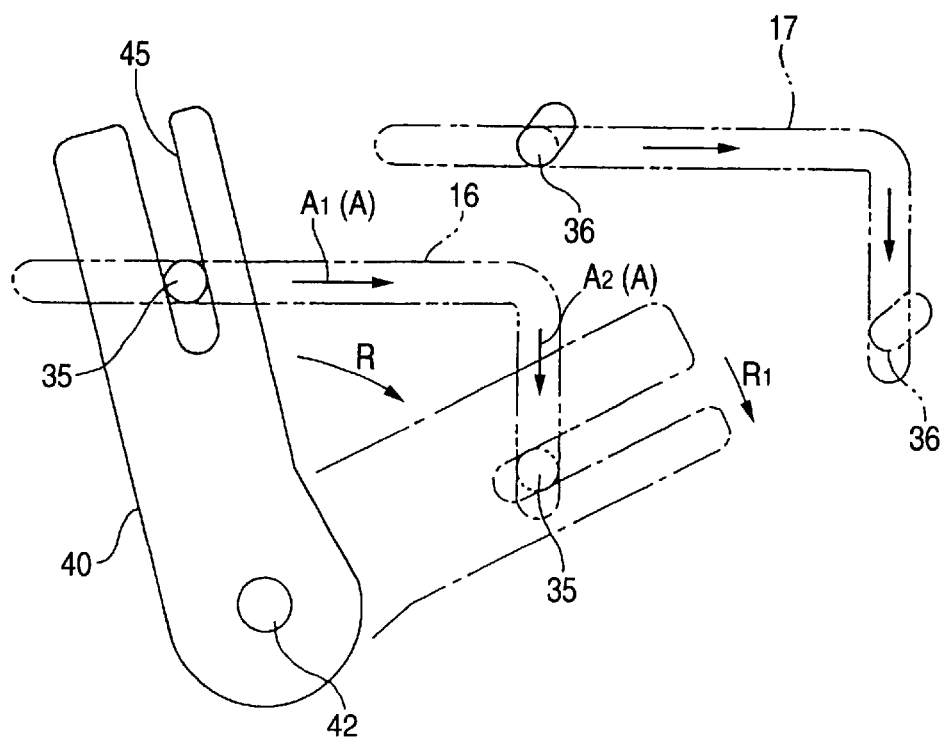
FIG. 3 is a diagram showing the operation of table driving levers (swing levers)
Figure 4:
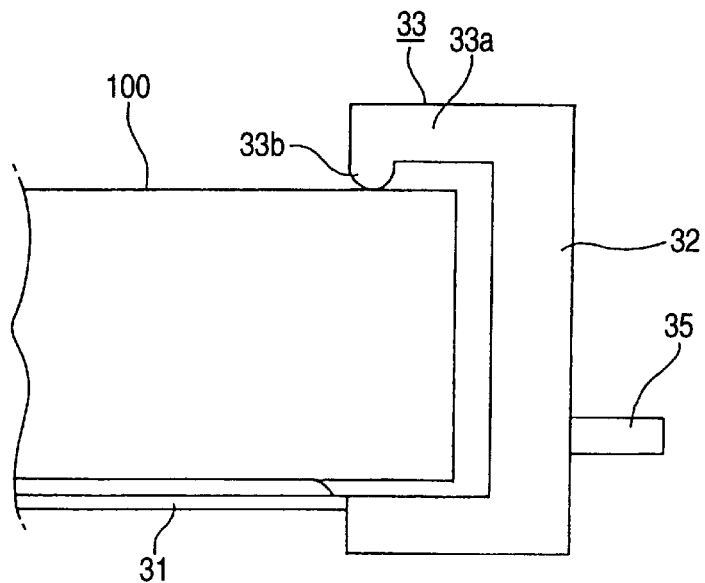
FIG. 4 is a view illustrating the function of the embodiment.
Figure 5:
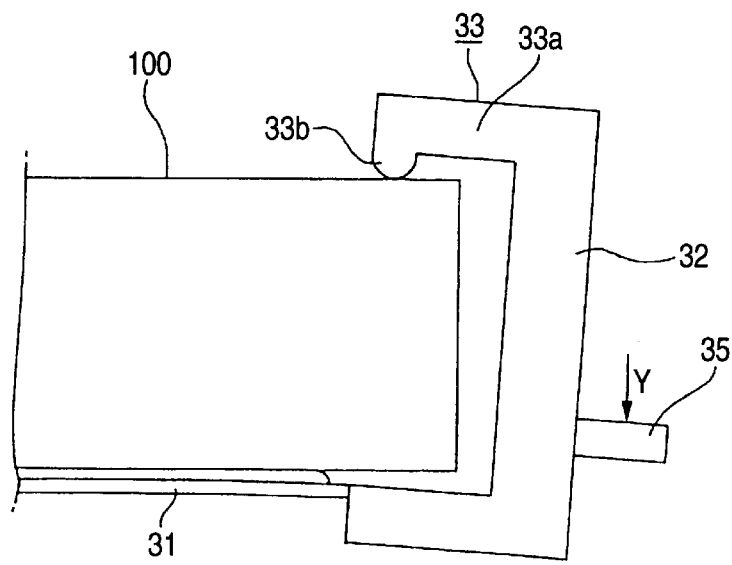
FIG. 5 is a view illustrating the function of the embodiment.
Figure 6:
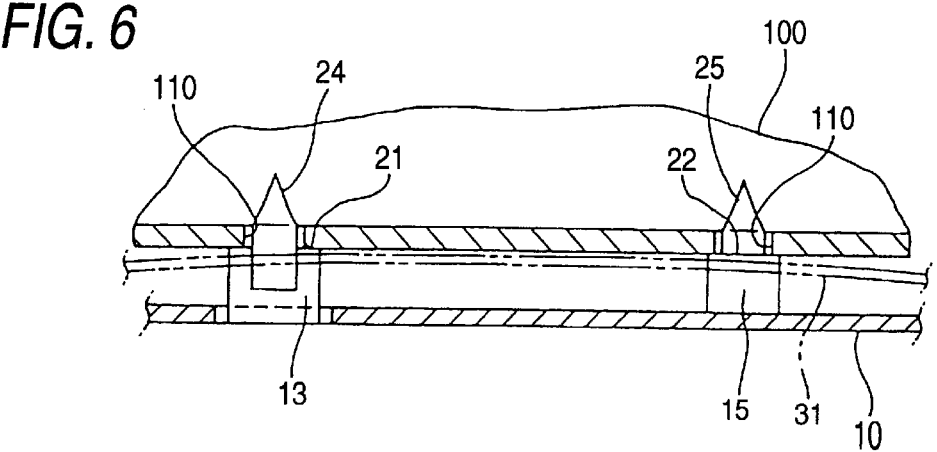
FIG. 6 is a partial sectional view illustrating a support plate which is elastically deformed.

FIG. 1 is a front view illustratively showing main portions of an embodiment of the magnetic tape device of the invention, FIG. 2 is a schematic sectional view of a portion along the line II—II of FIG. 1, FIG. 3 is a diagram showing the operation of the table driving levers 40, FIGS. 4 and 5 are views illustrating the function, and FIG. 6 is a partial sectional view illustrating the support plate 31 which is elastically deformed.

The configuration of the embodiment is different from that of the conventional magnetic tape device which has been described with reference to FIGS. 12 to 17, in the configurations of the cassette table 30 and the table driving levers 40. Also, the spring plate 34 and the spring members 44 which are used in the conventional magnetic tape device are omitted in this embodiment.

The embodiment is identical with the conventional magnetic tape device which has been described with reference to FIGS. 12 to 17, in that the cassette table 30 includes the support plate 31 which is configured by a laterally extending metal plate member; the lateral side walls 32 which are fixed to the lateral ends of the support plate 31 respectively; and the cassette pressers 33 which are disposed integrally with upper end portions of the side walls 32 respectively, but different in that each of the cassette pressers 33 has a protruding piece 33a which extends above the upper face of tape cassette 100 placed on the support plate 31; and a protrusion 33b which downwardly protrudes from the protruding piece 33a to face the upper face of the tape cassette 100. The embodiment is different also in that the vertical gap across which the support plate 31 is opposed to the protrusion 33b of each of the cassette pressers 33 is slightly smaller than the thickness of the tape cassette 100. As a result of this configuration of the cassette table 30, when the tape cassette 100 is placed on the support plate 31 at the cassette insertion position, as shown in FIG. 2, the tape cassette 100 is interposed between the support plate 31 and the cassette pressers 33 to cause a state where the support plate 31 is slightly flexurally deformed against the elasticity of the plate itself. Therefore, the tape cassette 100 is clamped between the support plate 31 and the protrusions 33b of the cassette pressers 33 by a force corresponding to the reaction force to the elastic deformation of the support plate 31, so that the tape cassette 100 is surely positioned with respect to the cassette table 30. Consequently, it is not required to use the spring plate 34 which is employed in the conventional art, and which has been described with reference to FIG. 14.

Figure 13:
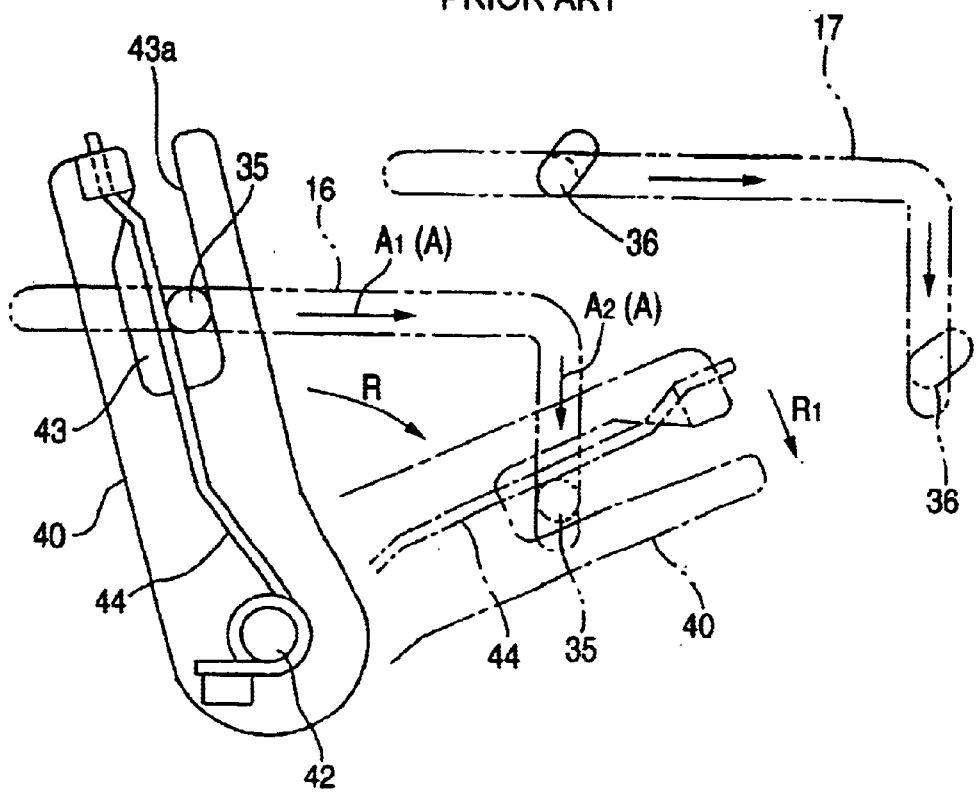
FIG. 13 is a diagram showing the operation of table driving levers in the conventional art.
Figure 14:
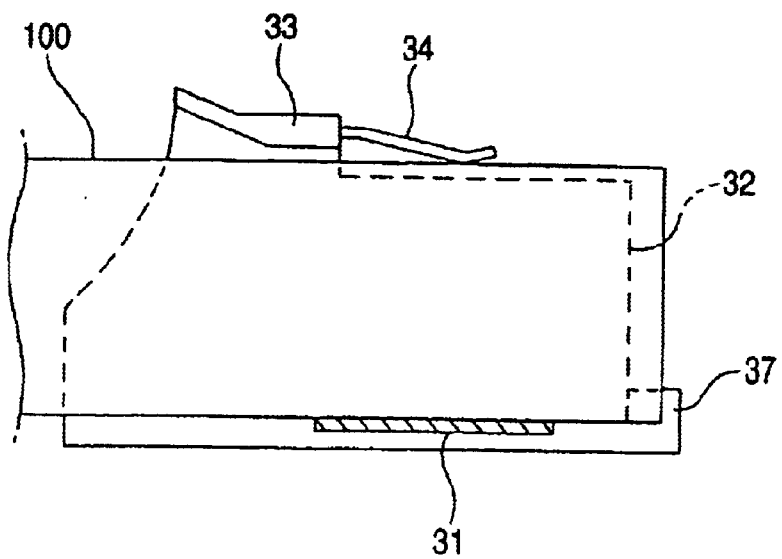
FIG. 14 is a schematic sectional view of a portion along the line XIV—XIV of FIG. 12.
Figure 15:
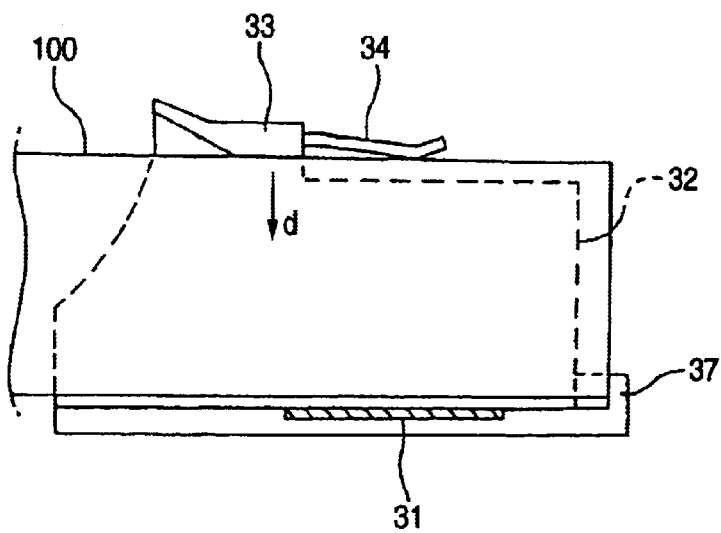
FIG. 15 is a schematic sectional view showing a state where, in the conventional magnetic tape device, cassette pressers press a tape cassette.
Figure 16:
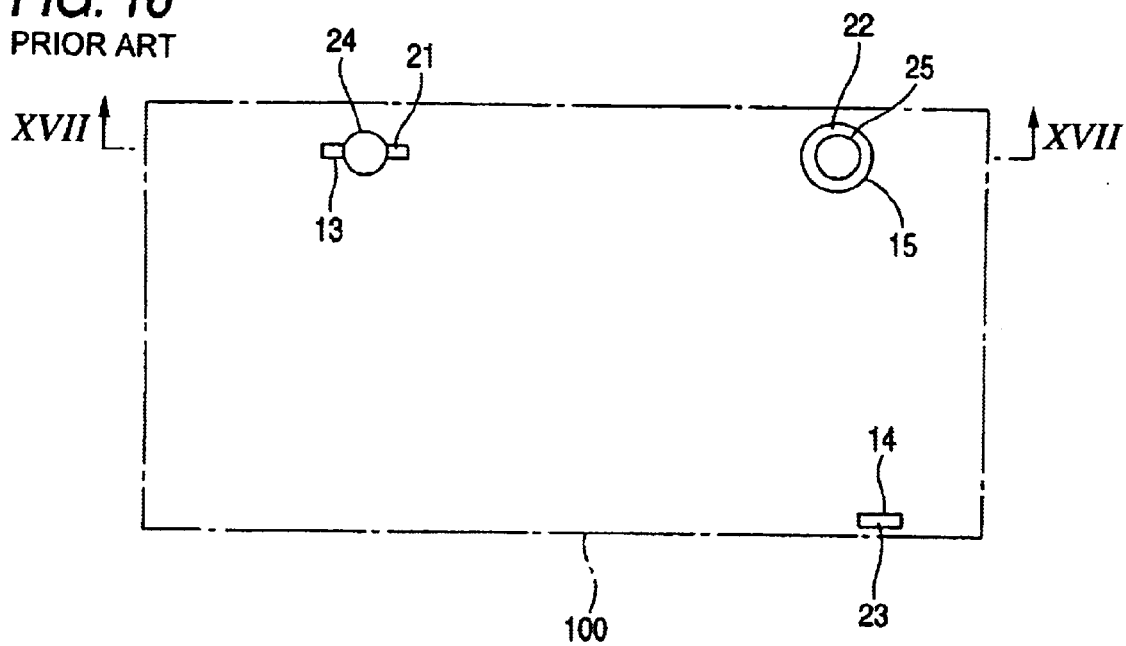
FIG. 16 is a view showing the arrangement of seats.
Figure 17:
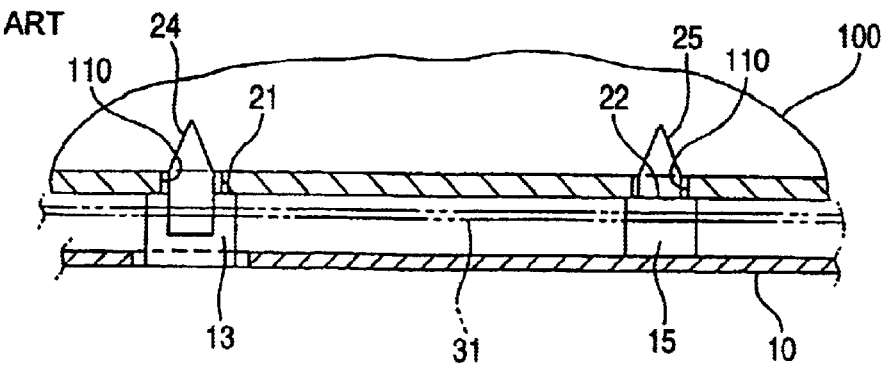
FIG. 17 is a schematic sectional view of a portion along the line XVII—XVII of FIG. 16.

The embodiment is identical with the conventional magnetic tape device which has been described with reference to FIGS. 12 to 17, in that the swinging operations of the table driving levers 40 are synchronized with each other by a synchronization shaft 41, and the table driving levers can be swung about the axis P which is indicated by the dashed line in FIG. 1, and also in that the basal portion of each of the table driving levers 40 is attached to the corresponding lateral side plate 11 of the chassis 10 via the support shaft 42 as shown in FIG. 3 and the axis of the support shaft 42 is brought into line with the above-mentioned axis P. However, the embodiment is different from the conventional magnetic tape device in that the width of a groove 45 of each of the table driving levers 40 shown in FIG. 3 is substantially equal to the diameter of the projections 35, the projections 35 are fitted into the grooves 45, and the spring members 44 in the conventional art described with reference to FIG. 13 are omitted.

The other configuration of the embodiment is identical with that of the conventional magnetic tape device which has been described with reference to FIGS. 12 to 17. In order to avoid duplicate description, therefore, identical or corresponding components are denoted by the same reference numerals, and detailed description of the structure is omitted.

Next, the function will be described.

When the cassette table 30 is located at the cassette insertion position, the projections 35 are located in the reciprocation paths A1 as indicated by the solid line in FIG. 3. The box-like tape cassette 100 is inserted on the cassette table 30 which is waiting at the cassette insertion position. As a result, as shown in FIG. 2, the tape cassette 100 in the state where it is placed on the support plate 31 abuts against the stoppers 37, and is clamped between the support plate 31 and the protrusions 33b of the cassette pressers 33 as shown in FIG. 4, so that the tape cassette 100 is positioned with respect to the cassette table 30.

When the table driving levers 40 are backwardly swung from this state as indicated by the arrow R in FIG. 3, the projections 35, which are fitted into the grooves 45 of the table driving levers 40, are backwardly moved in the reciprocation paths A1 in accordance with the backward swinging of the table driving levers 40. Thereafter, the table driving levers 40 are downwardly swung, so that the projections 35 enter the lift paths A2 from the reciprocation paths A1 and then go down in the lift paths A2. Therefore, the cassette table 30 also is moved together with the projections 35 along the reciprocation paths A1 and the lift paths A2. When the projections 35 are pressed down in the lift paths A2 by such an operation of the table driving levers 40, the cassette table 30 also is lowered together with the projections 35. On the way of the lowering of the cassette table 30, as shown in FIG. 6, the positioning holes 110 formed in the tape cassette 100 placed on the support plate 31 are fitted onto the guide pins 24 and 25, respectively, and the tape cassette 100 sits on the seats 21 and 22, and also on the seat 23 which has been described with reference to FIG. 16.

By contrast, even in a stage after the tape cassette 100 sits on the seats 21, 22, and 23, the table driving levers 40 are slightly downwardly swung. On the way of the swinging of the table driving levers 40 in this stage, the projections 35 are pressed down as indicated by the arrow Y in FIG. 5. As a result, the protrusions 33b of the cassette pressers 33 which abut against the upper face of the tape cassette 100 slide outward on the upper face of the tape cassette 100, and the side walls 32 are slightly inclined toward the outside while causing the support plate 31 to be flexurally deformed against the elasticity of the plate itself. In other words, the swinging operation of the table driving levers 40 in a stage after the tape cassette 100 sits on the seats 21, 22, and 23 is allowed by the inclining operation of the side walls 32, the flexural deformation of the support plate 31, and the sliding operation of the protrusions 33b of the cassette pressers 33 on the upper face of the tape cassette 100. By swinging R1 of the table driving levers 40 in this stage, the protrusions 33b of the cassette pressers 33 are caused to press the tape cassette 100 against the seats 21, 22, and 23, so that the tape cassette 100 is positioned to the reference position. As a result, it is not required to use the spring members 44 in the conventional art which have been described with reference to FIG. 13.

In the above, the loading operation which is conducted until the tape cassette 100, which is inserted on the cassette table 30 at the cassette insertion position, is positioned to the reference position has been described. The unloading operation which is conducted until the tape cassette 100 positioned at the reference position is ejected to the cassette insertion position will be described.

The table driving levers 40 are swung in the direction opposite to that descried above, so that the projections 35 are lifted up in the lift paths A2. In accordance with this, the cassette table 30 is raised, and, on the way of the raising, the tape cassette 100 sitting on the seats 21, 22, and 23 is placed on the support plate 31. The support plate 31 of the cassette table 30 is returned to its initial state by the elasticity of the plate itself. In accordance with the forward movement of the projections 35 in the reciprocation path A1, the cassette table 30 also is forwardly moved to reach the cassette insertion position.

In the embodiment, the cassette table 30 is moved between the cassette insertion position and the cassette delivery position via the cassette traveling path A, by using the table driving levers 40. Therefore, the swing levers, which are engaged with the projections 35 and press down the projections 35 to lower the cassette table 30 from a position above the cassette delivery position toward the cassette delivery position, are configured respectively by the members which are used also as the table driving levers 40.

Figure 7:
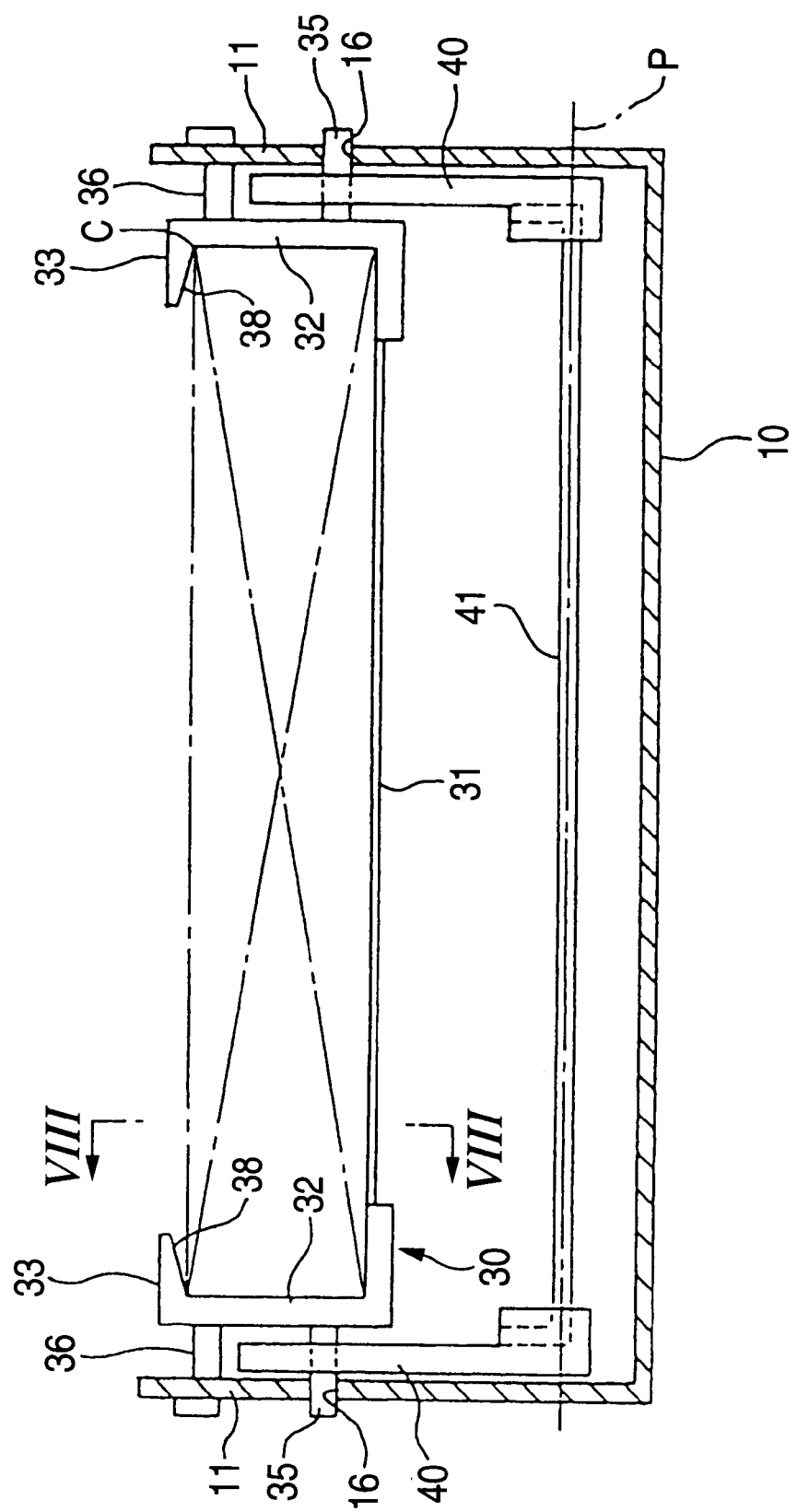
FIG. 7 is a front view illustratively showing main portions of another embodiment of the magnetic tape device of the invention.
Figure 8:
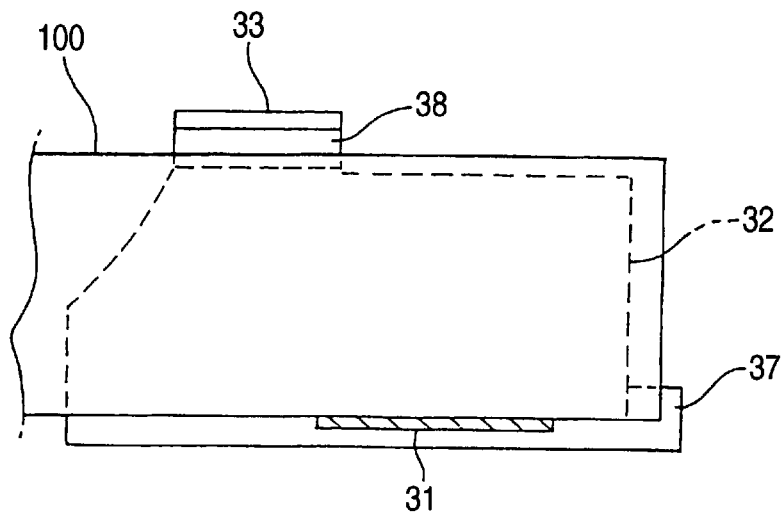
FIG. 8 is a schematic sectional view of a portion along the line VIII—VIII of FIG. 7.
Figure 9:
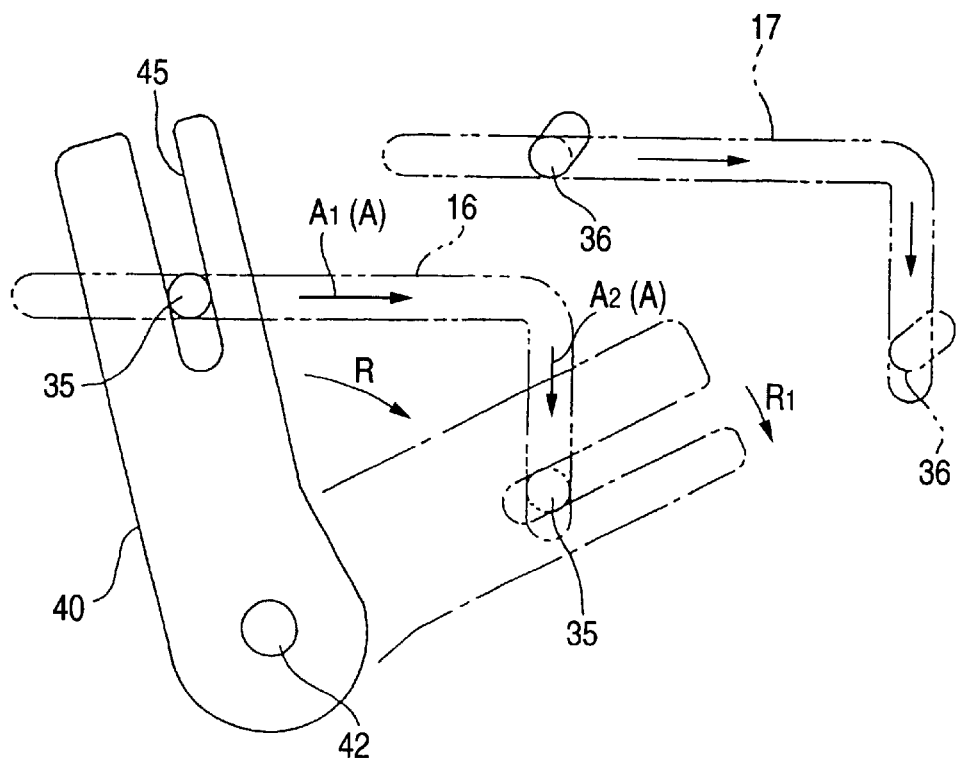
FIG. 9 is a diagram showing the operation of table driving levers 40.
Figure 10:
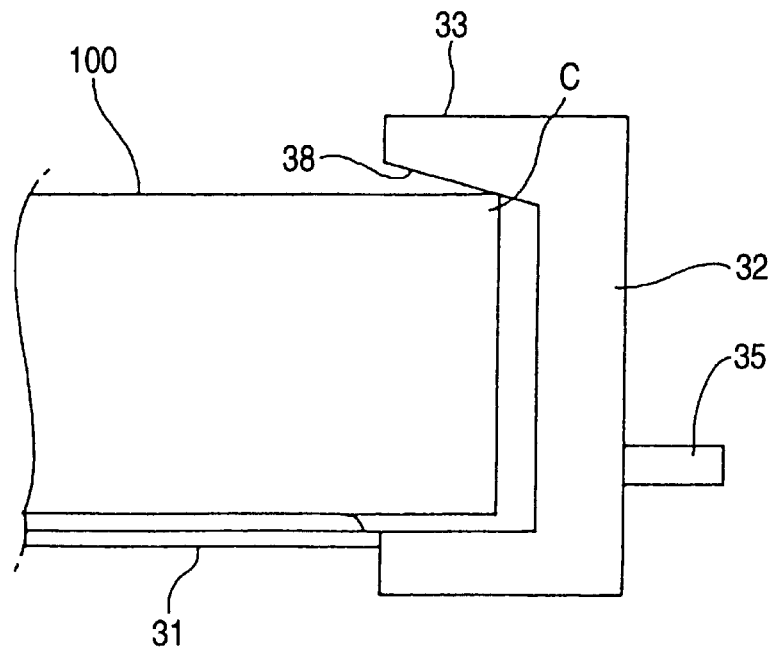
FIG. 10 is a view illustrating the function of the another embodiment.
Figure 11:
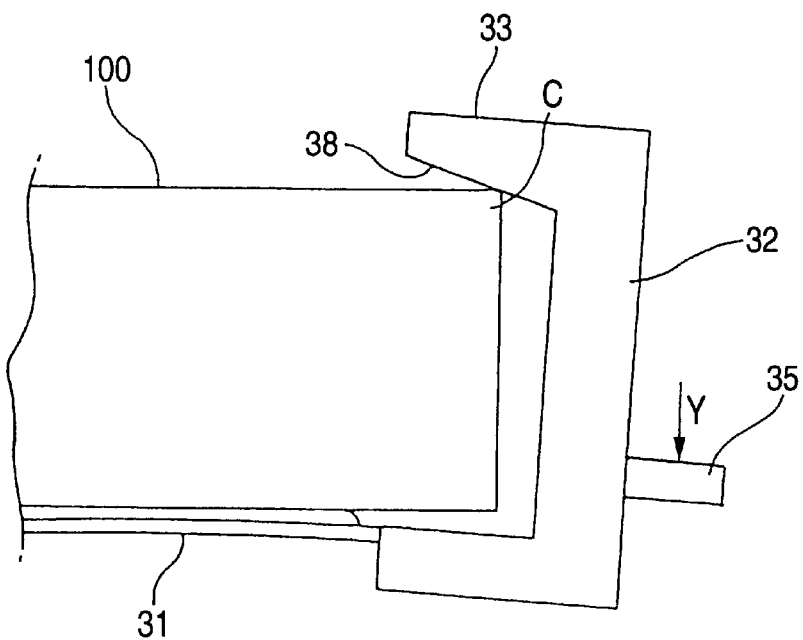
FIG. 11 is a view illustrating the function of the another embodiment.
Figure 12:
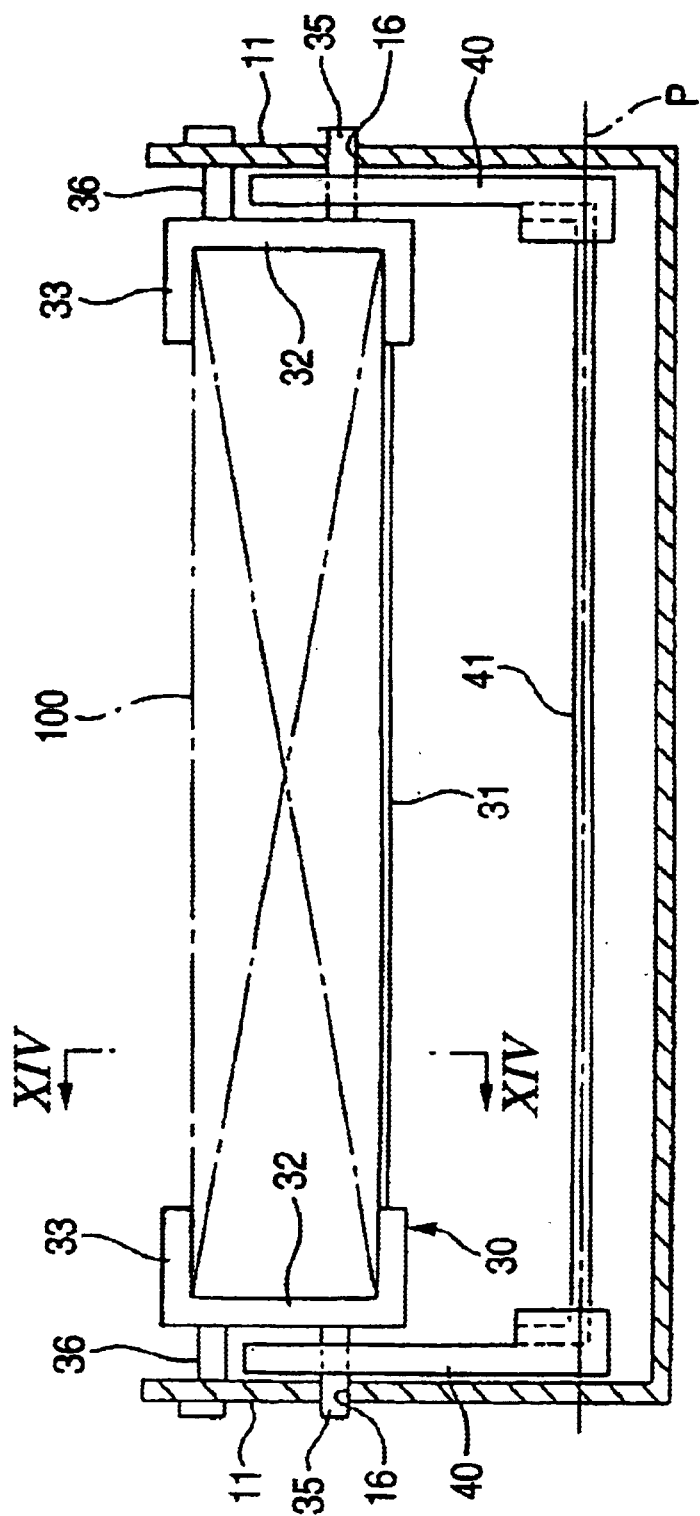
FIG. 12 is a front view illustratively showing main portions of a conventional magnetic tape device.

FIG. 7 is a front view illustratively showing main portions of another embodiment of the magnetic tape device of the invention, FIG. 8 is a schematic sectional view of a portion along the line VIII—VIII of FIG. 7, FIG. 9 is a diagram showing the operation of the table driving levers 40, and FIGS. 10 and 11 are views illustrating the function.

The configuration of the embodiment is different from that of the embodiment which has been described with reference to FIGS. 1 to 6, only in the configuration of the cassette table 30.

The embodiment is identical with the embodiment which has been described with reference to FIGS. 1 to 6, in that the cassette table 30 includes the support plate 31 which is configured by a laterally extending metal plate member; the lateral side walls 32 which are fixed to the lateral ends of the support plate 31 respectively; and the cassette pressers 33 which are disposed integrally with upper end portions of the side walls 32 respectively, but different in that each of the cassette pressers 33 has a forwardly and upwardly inclined face 38 which faces an edge C of the tape cassette 100 placed on the support plate 31.

In the embodiment, when the tape cassette 100 is placed on the support plate 31 at the cassette insertion position, as shown in FIG. 10, the tape cassette 100 is interposed between the support plate 31 and the inclined faces 38 of the cassette pressers 33 to cause a state where the support plate 31 is slightly flexurally deformed against the elasticity of the plate itself. Therefore, the tape cassette 100 is clamped between the support plate 31 and the inclined faces 38 of the cassette pressers 33 by a force corresponding to the reaction force to the elastic deformation of the support plate 31, so that the tape cassette 100 is surely positioned with respect to the cassette table 30. Consequently, it is not required to use the spring plate 34 which is employed in the conventional art, and which has been described with reference to FIG. 14.

The other configuration of the embodiment is identical with that of the conventional magnetic tape device which has been described with reference to FIGS. 12 to 17. In order to avoid duplicate description, therefore, identical or corresponding components are denoted by the same reference numerals, and detailed description of the structure is omitted.

Next, the function will be described.

When the cassette table 30 is located at the cassette insertion position, the projections 35 are located in the reciprocation paths A1 as indicated by the solid line in FIG. 9. The box-like tape cassette 100 is inserted on the cassette table 30 which is waiting at the cassette insertion position. As a result, as shown in FIG. 8, the tape cassette 100 in the state where it is placed on the support plate 31 abuts against the stoppers 37, and is clamped between the support plate 31 and the inclined faces 38 of the cassette pressers 33 as shown in FIG. 10, so that the tape cassette 100 is positioned with respect to the cassette table 30.

When the table driving levers 40 are backwardly swung from this state as indicated by the arrow R in FIG. 9, the projections 35, which are fitted into the grooves 45 of the table driving levers 40, are backwardly moved in the reciprocation paths A1 in accordance with the backward swinging of the table driving levers 40. Thereafter, the table driving levers 40 are downwardly swung, so that the projections 35 enter the lift paths A2 from the reciprocation paths A1 and then go down in the lift paths A2. Therefore, the cassette table 30 also is moved together with the projections 35 along the reciprocation paths A1 and the lift paths A2. When the projections 35 are pressed down in the lift paths A2 by such an operation of the table driving levers 40, the cassette table 30 also is lowered together with the projections 35. On the way of the lowering of the cassette table 30, the positioning holes 110 formed in the tape cassette 100 placed on the support plate 31 are fitted onto the guide pins 24 and 25, respectively, and the tape cassette 100 sits on the seats 21 and 22, and also on the seat 23 which has been described with reference to FIG. 16 (see FIG. 6).

Even in a stage after the tape cassette 100 sits on the seats 21, 22, and 23, the table driving levers 40 are slightly downwardly swung. On the way of the swinging of the table driving levers 40 in this stage, the projections 35 are pressed down as indicated by the arrow Y in FIG. 11. As a result, the inclined faces 38 of the cassette pressers 33 which abut against the upper face of the tape cassette 100 slide outward on the edges C of the tape cassette 100, and the side walls 32 are slightly inclined toward the outside while causing the support plate 31 to be flexurally deformed against the elasticity of the plate itself. In other words, the swinging operation of the table driving levers 40 in a stage after the tape cassette 100 sits on the seats 21, 22, and 23 is allowed by the inclining operation of the side walls 32, the flexural deformation of the support plate 31, and the sliding operation of the inclined faces 38 of the cassette pressers 33 on the edges C of the tape cassette 100. By swinging R1 of the table driving levers 40 in this stage, the inclined faces 38 of the cassette pressers 33 are caused to press the tape cassette 100 against the seats 21, 22, and 23, so that the tape cassette 100 is positioned to the reference position. As a result, it is not required to use the spring members 44 in the conventional art which have been described with reference to FIG. 13.

In the above, the loading operation which is conducted until the tape cassette 100, which is inserted on the cassette table 30 at the cassette insertion position, is positioned to the reference position has been described. The unloading operation which is conducted until the tape cassette 100 positioned at the reference position is ejected to the cassette insertion position will be described.

The table driving levers 40 are swung in the direction opposite to that descried above, so that the projections 35 are lifted up in the lift paths A2. In accordance with this, the cassette table 30 is raised, and, on the way of the raising, the tape cassette 100 sitting on the seats 21, 22, and 23 is placed on the support plate 31. The support plate 31 of the cassette table 30 is returned to its initial state by the elasticity of the plate itself. In accordance with the forward movement of the projections 35 in the reciprocation path A1, the cassette table 30 also is forwardly moved to reach the cassette insertion position.

In the embodiment, the cassette table 30 is moved between the cassette insertion position and the cassette delivery position via the cassette traveling path A, by using the table driving levers 40. Therefore, the swing levers, which are engaged with the projections 35 and press down the projections 35 to lower the cassette table 30 from a position above the cassette delivery position toward the cassette delivery position, are configured respectively by the members which are used also as the table driving levers 40.

As described above, according to the invention, a tape cassette can be positioned onto the cassette table, or to a reference position by using the elasticity of the support plate provided in the cassette table. Therefore, spring members and a spring plate which are used in a conventional magnetic tape device can be omitted, and hence the invention attains an effect that the number of parts is reduced and the cost reduction can be easily realized.

What is claimed is:

1. A magnetic tape device comprising:
    a cassette table which is moved in a cassette traveling path that elongates between a cassette insertion position and a cassette delivery position which is below the cassette insertion position, the cassette table including:
        a support plate on which a tape cassette is placed, the support plate is configured by an elastic metal plate member;
        a plurality of side walls fixed to lateral ends of the support plate respectively, each of side walls having a projection;
        a plurality of cassette pressers disposed on upper end portions of the side walls, the cassette pressers face the tape cassette from an upper side;
        a plurality of swing levers engaged with the projection, the swing levers are downwardly swingable from a predetermined position thereby pressing down the projection to lower the cassette table from a position which is above the cassette delivery position toward the cassette delivery position; and
        a plurality of seats on which the tape cassette is sittable on the way of the cassette table down to the cassette delivery position,
    wherein the swing levers are configured respectively by members which are also used as table driving levers that move the cassette table between the cassette insertion position and the cassette delivery position through the cassette traveling path,
    the tape cassette placed on the support plate at the cassette insertion position is positioned with respect to the cassette table by being clamped between the support plate and the cassette pressers,
    the swinging operation of the swing levers for pressing down the projections in a state where the tape cassette sits on the seats is allowed by a sliding operation of the cassette pressers with respect to the tape cassette, the sliding operation being conducted with flexurally deforming the support plate against elasticity of the support plate.

2. A magnetic tape device comprising:
    a cassette table which is moved in a cassette traveling path that elongates between a cassette insertion position and a cassette delivery position which is below the cassette insertion position, the cassette table including:
        a support plate on which a tape cassette is placed;
        a cassette presser disposed on the support plate, the cassette presser faces the tape cassette from an upper side;
        a table pressing-down member for lowering the cassette table from a position which is above the cassette derivery position toward the cassette delivery position; and a seat on which the tape cassette is sittable on the way of the cassette table down to the cassette delivery position, wherein the tape cassette is pressed down and positioned to a reference position by the cassette presser which moves together with the cassette table, the support plate is configured by an elastic plate member, swinging operation of the table pressing-down member in a state where the tape cassette sits on the seat is allowed by a sliding operation of the cassette pressers with respect to the tape cassette, the sliding operation being conducted with flexurally deforming the support plate against elasticity of the support plate.

3. The magnetic tape device according to claim 2, wherein the cassette presser is integrated with upper end portion of a side wall which is fixed to an end portion of the support plate, the side wall is opposed to a side face of the tape cassette placed on the support plate.

4. The magnetic tape device according to claim 3, wherein the table pressing-down member includes a swing lever which is engaged with a projection disposed on the side wall, the swing lever is downwardly swingable from a predetermined position thereby pressing down the projection to lower the cassette table from a position which is above the cassette delivery position toward the cassette delivery position.

5. The magnetic tape device according to claim 4, wherein the side wall comprises a plurality of side walls each of which including the cassette presser, the side walls are fixed to lateral ends of the support plate respectively, the swing lever comprises a plurality of swing levers which operate in synchronization with each other, the swing levers are engaged with the projections disposed on the side walls respectively.

6. The magnetic tape device according to claim 2, wherein the cassette presser includes a protruding piece which extends above the tape cassette placed on the support plate, and a protrusion which downwardly protrudes from the protruding piece to face an upper face of the tape cassette.

7. The magnetic tape device according to claim 2, wherein the cassette presser has a forward and upward inclined face, which faces an edge of the tape cassette, placed on the support plate.

8. The magnetic tape device according to claim 2, wherein the tape cassette placed on the support plate at the cassette insertion position is positioned with respect to the cassette table by being clamped between the support plate and the cassette presser.

* * * * *

UNITED STATES PATENT AND TRADEMARK OFFICE
CERTIFICATE OF CORRECTION

PATENT NO. : 6,717,767 B2
DATED : April 6, 2004
INVENTOR(S) : Kunio Sawai

It is certified that error appears in the above-identified patent and that said Letters Patent is hereby corrected as shown below:

<u>Title page,</u>
Item [56], References Cited, U.S. PATENT DOCUMENTS, please insert -- U.S. Patent 3,603,743, issue date September 7, 1971. --

Signed and Sealed this

Twenty-ninth Day of June, 2004

JON W. DUDAS
*Acting Director of the United States Patent and Trademark Office*